United States Patent
Kanoh

(10) Patent No.: US 8,280,689 B2
(45) Date of Patent: Oct. 2, 2012

(54) SAVING HISTORY AND FORMAT INFORMATION OF A DOCUMENT TOGETHER

(75) Inventor: Takayuki Kanoh, Ikoma-Gun (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 592 days.

(21) Appl. No.: 12/154,371

(22) Filed: May 21, 2008

(65) Prior Publication Data

US 2008/0291494 A1 Nov. 27, 2008

(30) Foreign Application Priority Data

May 22, 2007 (JP) ................................. 2007-135842

(51) Int. Cl.
*G06F 17/40* (2006.01)
*G06F 11/00* (2006.01)
*G06K 15/00* (2006.01)
*G06F 3/12* (2006.01)

(52) U.S. Cl. ...... 702/187; 702/188; 358/1.14; 358/1.15; 358/1.16

(58) Field of Classification Search ............... 358/1.14, 358/1.15, 1.16; 702/187, 188
See application file for complete search history.

(56) References Cited

U.S. PATENT DOCUMENTS

| | | | |
|---|---|---|---|
| 2003/0018802 A1* | 1/2003 | Romanik et al. | 709/234 |
| 2005/0141010 A1* | 6/2005 | Kanai | 358/1.14 |
| 2005/0168769 A1* | 8/2005 | Kim et al. | 358/1.14 |
| 2006/0061802 A1* | 3/2006 | Ogura | 358/1.15 |
| 2007/0097426 A1* | 5/2007 | Nanaumi | 358/1.15 |
| 2008/0217403 A1* | 9/2008 | Ormond | 235/385 |

FOREIGN PATENT DOCUMENTS

| | | |
|---|---|---|
| JP | 2007-043726 | 5/1995 |
| JP | 2005-020062 | 1/2005 |
| JP | 2007-306310 | 11/2007 |

* cited by examiner

*Primary Examiner* — Benny Q Tieu
*Assistant Examiner* — Eric A Rust
(74) *Attorney, Agent, or Firm* — Edwards Wildman Palmer LLP; David G. Conlin; George N. Chaclas

(57) ABSTRACT

An image processing device in which predetermined image processing is carried out on image data, and the image data that has been processed is saved as processing history information, is provided with: a format determination means that determines whether or not the image data is in a specified document format, and a saving means that, when it is judged that the image data determined by the format determination means is in the specified document format, saves format information of the specified document format together with the image data as the processing history information.

8 Claims, 18 Drawing Sheets

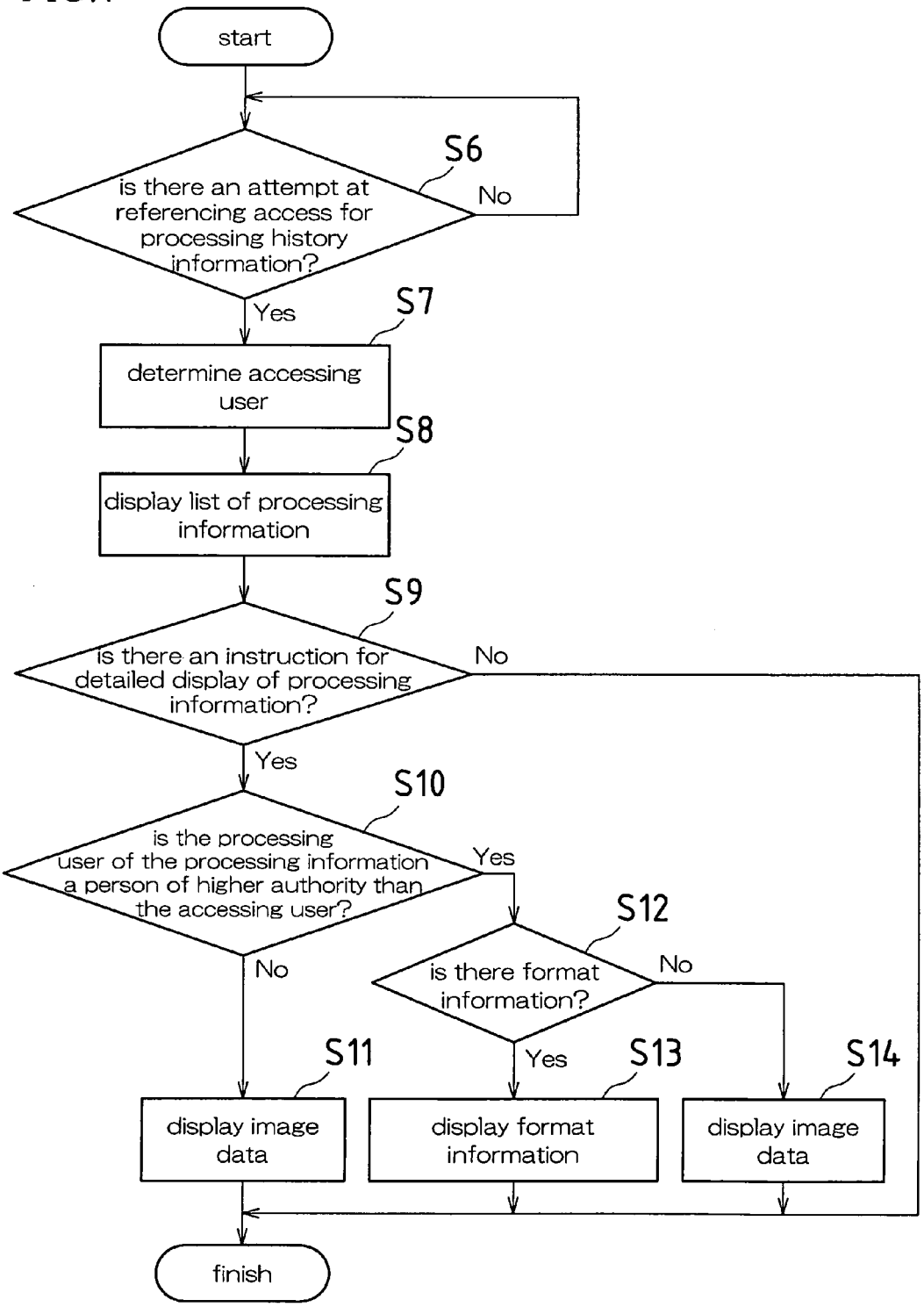

FIG.8a processing information list window

| ○ | 1 | FAX | 3P | Ito |
| ⊙ | 2 | COPY | 1P | Ito |
| ○ | 3 | COPY | 10P | Kimura |
| ○ | 4 | PRINT | 4P | Tanaka | detailed display   close

FIG.8b

No. 2 processing information monthly report close

FIG.8c

No. 2 processing information monthly report close

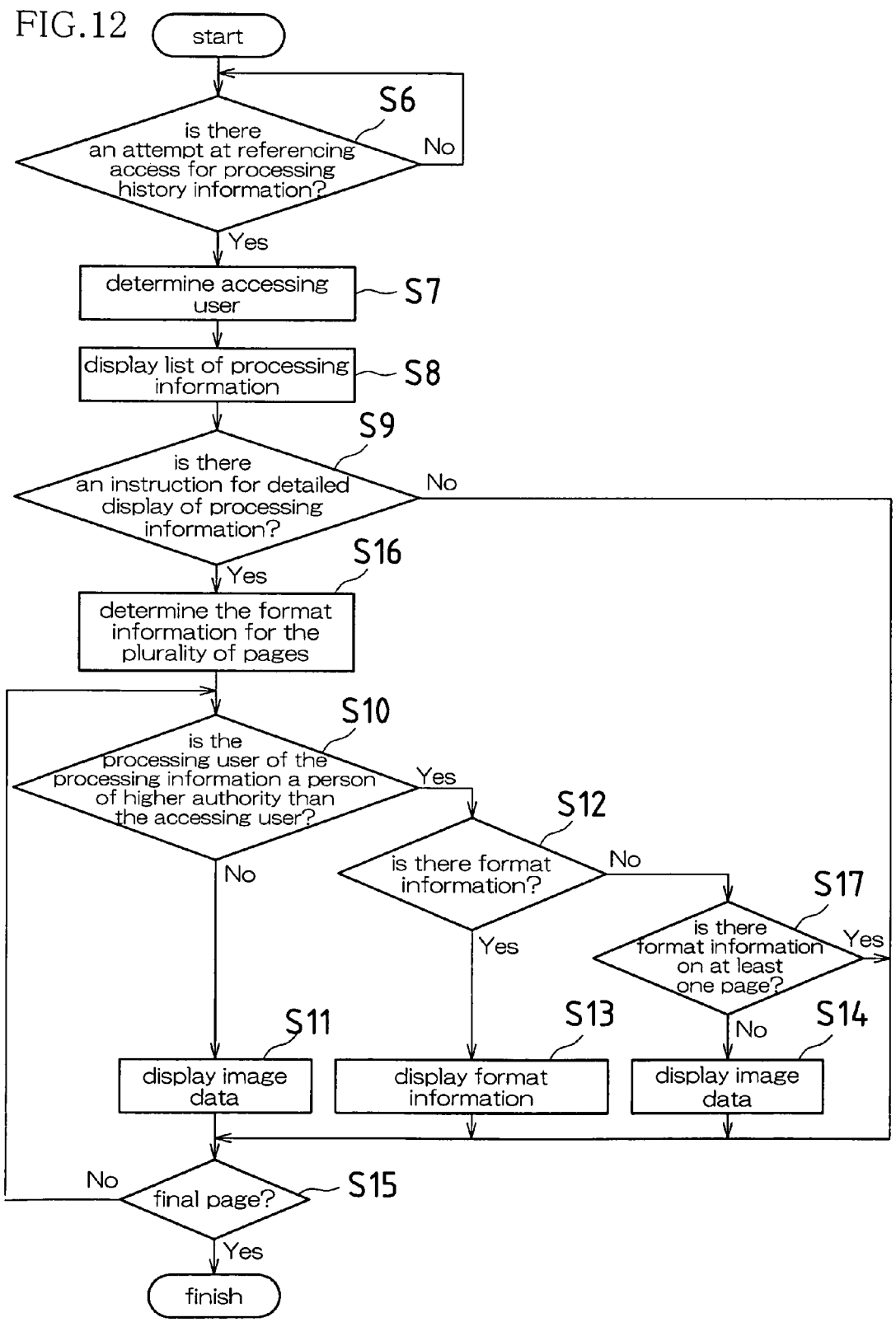

SAVING HISTORY AND FORMAT INFORMATION OF A DOCUMENT TOGETHER

This application claims priority under 35 U.S.C. §119(a) on Japanese Patent Application No. 2007-135842 filed in Japan on May 22, 2007, the entire contents of which are herein incorporated by reference.

BACKGROUND OF THE INVENTION

1. Field of the Invention

The present invention relates to image processing devices and image processing servers that save processed image data as processing history information.

2. Prior Art

Conventionally there are image processing devices such as scanner devices and printers that carry out predetermined image processing on image data and store the processed image data as processing history information. Furthermore, there are image processing servers that are connected to such image processing devices via a network that store the image data sent from the image processing device as processing history information.

It should be noted that the processing history information is stored for such purposes as totalizing usage conditions of consumables and monitoring whether the image processing device is being used for private purposes. That is, if monitoring is not conducted as to whether an image processing device for official purposes such as an office image processing device is being used for the private purposes of individuals, there is a problem in that consumables such as toner and paper, which have been purchased for official purposes, may be being used wastefully. Accordingly, an administrator determines whether or not there is private purpose usage by checking the image data of the image processing device.

In conventional image processing devices and image processing servers such as these, highly confidential data may be present in the image data that is processed. For this reason, an image processing device has been proposed in which access restrictions are carried out for viewing the processing history information (see JP 2005-20062A).

In this image processing device, authority is granted to view the image data to a person of higher authority than a user who processed the image data.

However, with the image processing device described in JP 2005-20062A, there is a problem in that when the image data is highly confidential, the image data cannot be referenced except by a person of higher authority, and therefore a person without authority, even an administrator for example, cannot distinguish the type of image data and cannot carry out management based on document formats (for example, formats such as reports, weekly bulletins, and the like) as to whether the image data is being used for private purposes.

SUMMARY OF THE INVENTION

The present invention has been devised in light of these circumstances, and it is an object thereof to provide an image processing device and an image processing server in which management can be carried out based on document format while maintaining the confidentiality of the image data even when the image data is highly confidential.

In the present invention, a following image processing device and image processing server are provided to address these issues.

Namely, an image processing device according to the present invention in which predetermined image processing is carried out on image data, and the image data that has been processed is saved as processing history information comprises a format determination means that determines whether or not the image data is in a specified document format, and a saving means that, when it is judged that the image data determined by the format determination means is in the specified document format, saves format information of the specified document format together with the image data as the processing history information.

Furthermore, an image processing server according to the present invention, which is connected via a network to one or a plurality of image processing devices in which predetermined image processing is carried out on image data, and which saves image data sent from the image processing device as processing history information, comprises a format determination means that determines whether or not the image data sent from the image processing device is in a specified document format, and a saving means that, when it is judged that the image data determined by the format determination means is in the specified document format, saves format information of the specified document format together with the image data as the processing history information.

In the present invention, the specified formats may be document formats used for documents designated as highly confidential. Furthermore, the format refers to document formats (forms) such as reports, weekly bulletins, applications, and the like. Examples that can be put forth for the format information include prescribed forms for reports, weekly bulletins, applications and the like, format or layout, shape of tables and ruled lines and the like, and placement positions. Examples that can be put forth for the image processing device include copiers, scanner devices, facsimile machines, and printers, as well as multifunction machines provided with a copier function, a scanner function, a facsimile function, and a printer function.

Furthermore, in addition to the image data and format information, the processing history information may include processing information such as the number of pages of processed image data (for example, the number of pages of color images and the number of pages of monochrome images), processing times, user information, and job classification information (for example, copying, facsimile, printing).

With the image processing device or the image processing server according to the present invention, in the saving means, when the image data determined by the format determination means is judged to be in the specified document format, the format information of the specified document format is saved together with the image data as the processing history information, and therefore only the format information can be referenced by a person not having authority for image data that is highly confidential, thereby enabling notification to be given as to the type of image data while maintaining the confidentiality of the image data, and this enables persons not having authority of an administrator or the like to determine at least whether or not the image involves private use (that is, whether or not the image processing device is being used for private purposes) and enables management to be carried out based on document format (for example, formats such as reports and weekly bulletins) as to whether or not the image data involves usage for private purposes.

The image processing device or image processing server according to the present invention may further comprise: a user storage means that stores user authority information, an authority determination means that determines an authority to reference the image data based on the user authority information stored by the user storage means, and a deciding means that decides which of the image data and the format information saved together with the image data, which are saved as the processing history information, is to be outputted in accordance with the authority determined by the authority determination means.

In this configuration, when the image data saved by the saving means is constituted by a plurality of pages, the deciding means may decide for each of the pages which of the image data of the page and the format information of the page is to be outputted in accordance with the authority determined by the authority determination means. In this case it is preferable that the deciding means further determines whether or not at least one page among the plurality of pages contains format information and, when it is determined by the authority determination means that there is no authority to reference the image data, outputs the format information for any page having format information, and does not output image data of the page for pages not having format information, when format information is contained in at least one page.

Furthermore, the image processing device according to the present invention, in which predetermined image processing is carried out on image data, and the image data that has been processed is saved as processing history information, may comprise a format determination means that determines whether or not the image data is in a specified document format, and a saving means that, when it is judged that the image data determined by the format determination means is in the specified document format, saves format information of the specified document format as the processing history information instead of saving the image data.

Similarly, the image processing server according to the present invention, which is connected via a network to one or a plurality of image processing devices in which predetermined image processing is carried out on image data, and which saves image data sent from the image processing device as processing history information, may comprise a format determination means that determines whether or not the image data sent from the image processing device is in a specified document format, and a saving means that, when it is judged that the image data determined by the format determination means is in the specified document format, saves format information of the specified document format as the processing history information instead of saving the image data.

The above-described image processing device or image processing server according to the present invention may further comprise a format storage means that stores one or a plurality of types of format information in regard to the specified document formats, and the format determination means may determine whether or not the image data is in the specified document format by performing matching between the image data and the one or plurality of types of format information stored by the format storage means.

Furthermore, in the above-described image processing device or image processing server according to the present invention, the format determination means may determine whether or not the image data is in the specified document format by extracting specified information contained in the image data. Examples that can be put forth of the specified information contained in the image data typically includes a one-dimensional barcode or a two-dimensional barcode such as a QR code.

BRIEF DESCRIPTION OF THE DRAWINGS

FIG. 7 is a flowchart showing one example of a processing routine of outputting and displaying on a display unit the processing history information that has been saved in accordance with the processing routines shown in FIGS. 5 and 6.

FIG. 8(a) shows an example of a display screen that is outputted and displayed on the display unit in the processing routine shown in FIG. 7, and shows the display screen in which processing information is displayed as a list.

FIG. 8(b) shows an example of a display screen that is outputted and displayed on the display unit in the processing routine shown in FIG. 7, and shows the display screen in a case where a processing user of the processing information is not a person of higher authority than a user attempting access to reference.

FIG. 8(c) shows an example of a display screen that is outputted and displayed on the display unit in the processing routine shown in FIG. 7, and shows the display screen of format information in a case where a processing user of the processing information is a person of higher authority than the user attempting access to reference.

FIG. 12 is a flowchart showing another example of a processing routine of outputting and displaying on the display unit the processing history information in a case where the image data saved in accordance with the processing routines shown in FIGS. 5 and 6 is constituted by a plurality of pages.

DESCRIPTION OF THE PREFERRED EMBODIMENTS

Hereinafter, embodiments of the present invention are described in detail with reference to the accompanying drawings.

First Embodiment

Figure 1:
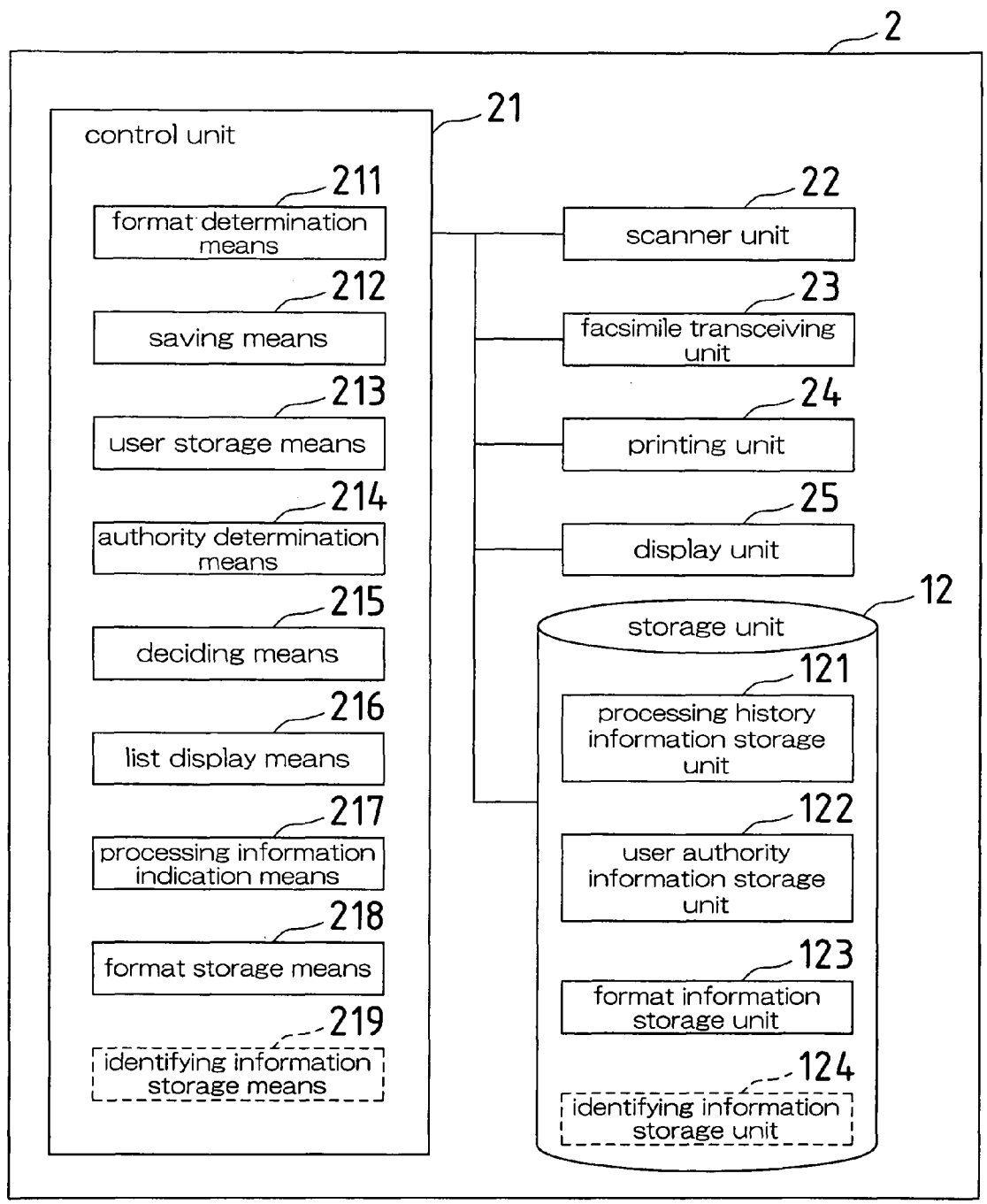
FIG. 1 is a block diagram illustrating an outline configuration example of an image processing device according to the present invention.

FIG. 1 is a block diagram illustrating an outline configuration example of an image processing device according to the present invention. An image processing device 2 shown in FIG. 1 here is a digital multifunction machine that serves as a scanner device, a copier, a facsimile machine, and a printer.

The image processing device 2 is provided with a control unit 21, a scanner unit 22, a facsimile transceiving unit 23, a printing unit 24, a display unit 25, and a storage unit 12. The scanner unit 22, the facsimile transceiving unit 23, the printing unit 24, the display unit 25, and the storage unit 12 are connected to the control unit 21. The image processing device 2 is provided with a scanner function involving reading a manuscript image using the scanner unit 22, a copying function involving reading a manuscript image using the scanner unit 22, generating image data of the manuscript image, and printing this image data using the printing unit 24, a facsimile transmitting function involving reading a manuscript image using the scanner unit 22 and transmitting image data of the manuscript image using facsimile transmission of the facsimile transceiving unit 23, a facsimile receiving function involving receiving image data using facsimile reception of the facsimile transceiving unit 23 and printing this image data using the printing unit 24, and a printer function involving receiving image data from a personal computer (omitted in diagram) and printing this image data using the printing unit 24.

Specifically, the image processing device 2 is configured to carry out general image processing such as a process of generating bitmap data based on image data for printing in the printing unit 24, a process of converting data in order to send the image data that has been read by the scanner unit 22 to the printing unit 24, and processing data for transceiving using the FAX transceiving unit 23. Furthermore, each time image data is generated or received/transmitted during such events as printing or facsimile communications, the image processing device 2 generates processing information of the image data, and stores the image data and the processing information thereof as processing history information in the storage unit 12. Control here is implemented using the control unit 21.

That is, the control unit 21 includes a CPU and a memory such as a ROM and a RAM, which are not shown in the diagram, and is configured such that image processing and various types of control are carried out by using the CPU to read out various control programs from the memory and execute the control programs that have been read out.

And through these control programs, the control unit 21 is configured to function as means including a format determination means 211 that determines whether or not processed image data is in a specified document format and, a saving means 212 that, when the image data that has undergone determination by the format determination means 211 is determined to be in a specified document format, saves format information of the specified document format together with the image data in the storage unit 12 as processing history information. By doing this, in a case where the processed image data involves a highly confidential report or technical data for example, by granting authority to monitor the image data to a person of higher authority, the confidentiality of the image data can be maintained, and also by enabling a person not having this authority to reference only the format information when the image data is highly confidential in this manner, notification can be given as to the type of image data, and this enables management to be carried out as to whether or not the image data involves illicit usage in regard to document formats (for example, formats of reports and weekly bulletins and the like).

To describe this more specifically, the storage unit 12 is provided with a processing history information storage unit 121 that stores the processed image data as well as processing information and format information relating to the image data. It should be noted that the storage unit 12 here is a nonvolatile memory such as a magnetic disk device or the like.

Figure 2:
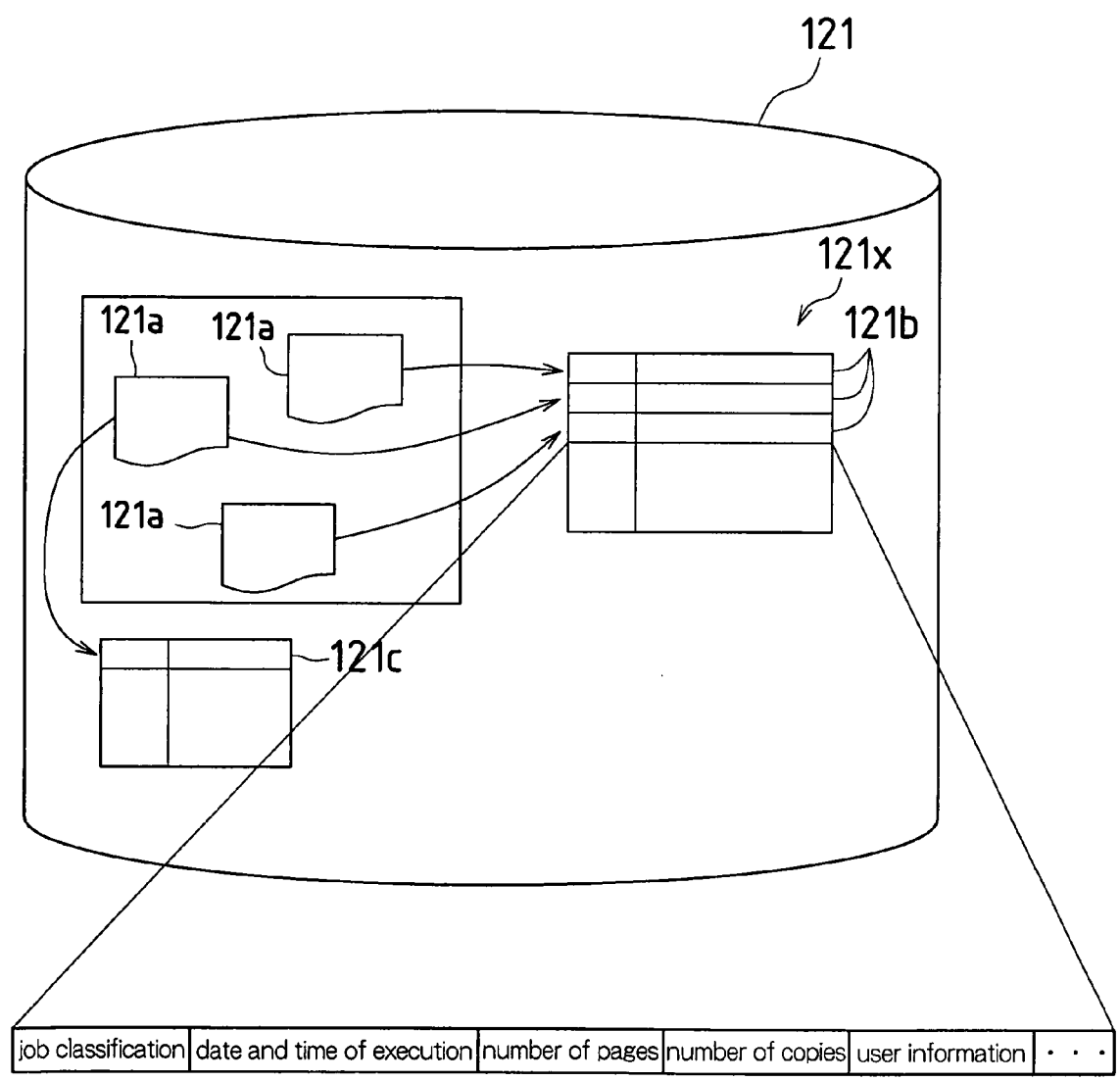
FIG. 2 is a diagram that schematically illustrates processing history information within a processing history information storage unit in the image processing device shown in FIG. 1.

FIG. 2 is a diagram that schematically illustrates processing history information within the processing history information storage unit 121 in the image processing device 2 shown in FIG. 1. As shown in FIG. 2, the processing history information storage unit 121 successively accumulates sets of image data 121a, . . . of each job and sets of processing information 121b, . . . corresponding to those jobs respectively as processing history information 121x, and, when any of the sets of image data 121a, . . . is in a specified document format, it also accumulates format information 121c of the specified document format.

The processing information 121b includes information of job classification (classifications such as copying, scanning, printing, facsimile communication, and the like), information of the date and time processing was executed, information of the number of pages of the image data 121a, information of the number of copies, and user information.

Furthermore, in the present embodiment, the storage unit 12 is further provided with a user authority information storage unit 122 that stores authority information of users. Here, authority information of users refers to an authority to reference image data.

Figure 3:
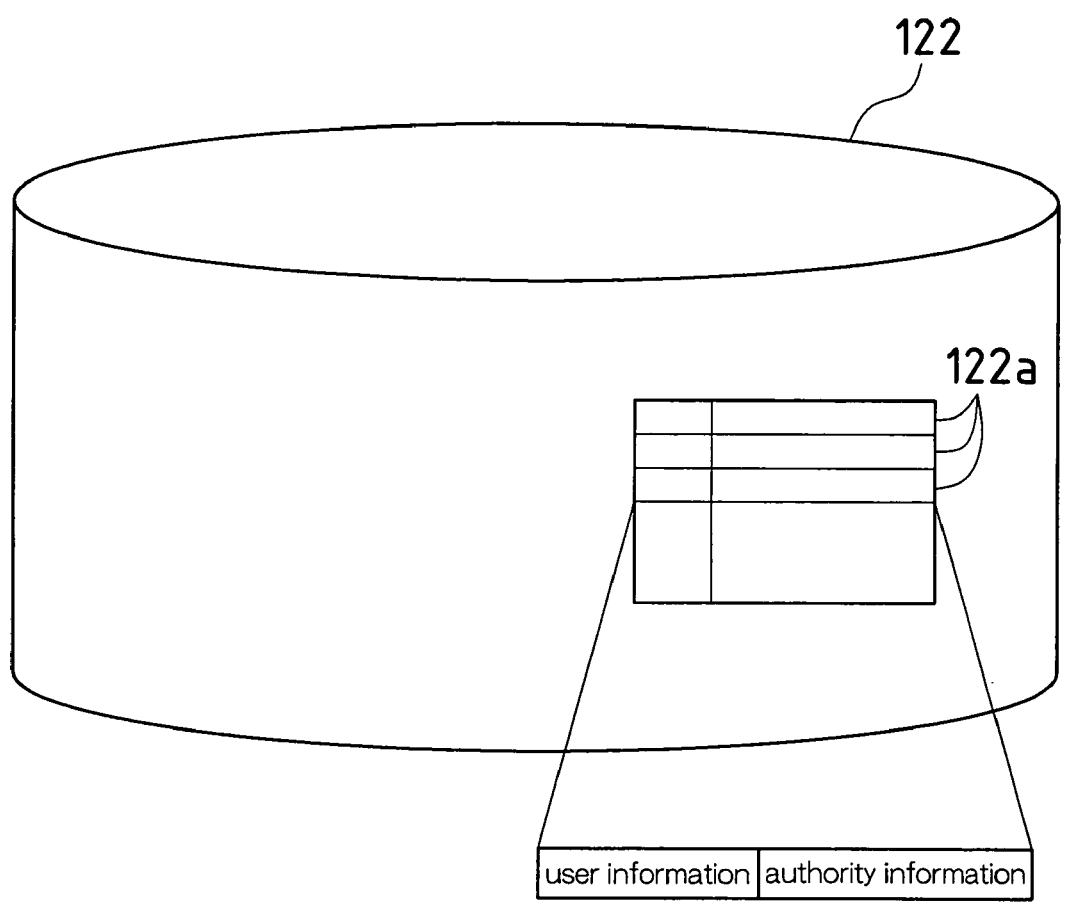
FIG. 3 is a diagram that schematically illustrates user authority information within a user authority information storage unit in the image processing device shown in FIG. 1.

FIG. 3 is a diagram that schematically illustrates user authority information within the user authority information storage unit 122 in the image processing device 2 shown in FIG. 1. As shown in FIG. 3, the user authority information storage unit 122 stores a plurality of sets of user information and authority information corresponding to the plurality of sets of the user information respectively as user authority information 122a.

In the present embodiment, through these control programs, the control unit 21 is configured to function as means further including a user storage means 213 that stores the plurality of sets of the user authority information 122a in the user authority information storage unit 122, an authority determination means 214 that determines an authority to reference the image data 121a, . . . based on the user authority information 122a of users to access the image data 121a among the user authority information 122a, . . . stored in the user authority information storage unit 122 by the user storage means 213, and a deciding means 215 that decides, in accordance with the authority determined by the authority determination means 214, which sets of the image data 121a and sets of the format information 121c saved together with those sets of image data 121a, which have been saved as processing history information 121x, are to be outputted. By doing this, without displaying the image data 121a, the format information 121c can be displayed to a person having a low access authority to access the image data 121a. In this way, it becomes possible to effectively prevent leaks of confidential documents. It should be noted that, as shown in FIG. 3, the plurality of sets of the user authority information 122a, . . . are stored in advance in the user authority information storage unit 122 by the user storage means 213.

Specifically, the deciding means 215 outputs the image data 121a when a result determined by the authority determination means 214 is that the accessing user has an authority to reference the image data (here, this is when a processing user of the processing information 121b is not a person of higher authority than the user attempting access to reference). Furthermore, the deciding means 215 is configured to output the format information 121c instead of the image data 121a when the accessing user does not have an authority to reference the image data (here, this is when a processing user of the processing information 121b is a person of higher authority than the user attempting access to reference).

Furthermore, in the present embodiment, through the control programs, the control unit 21 is configured to function as means further including a list display means 216 that reads out the processing information 121b, . . . from the processing history information 121x stored in the processing history information storage unit 121 and displays a list of the processing information 121b, . . . that has been read out, and a processing information indication means 217 that indicates which sets of the processing information displayed in a list by the list display means 216 is to undergo detailed display (image display).

In the present embodiment, the storage unit 12 is further provided with a format information storage unit 123 that stores a plurality of types of format information as the specified document formats. The specified formats here are document formats used for documents designated as highly confidential. Furthermore, format information here includes document format information such as layouts of reports and weekly bulletins and the like, format, shape of tables and ruled lines and the like, and placement positions.

Figure 4:
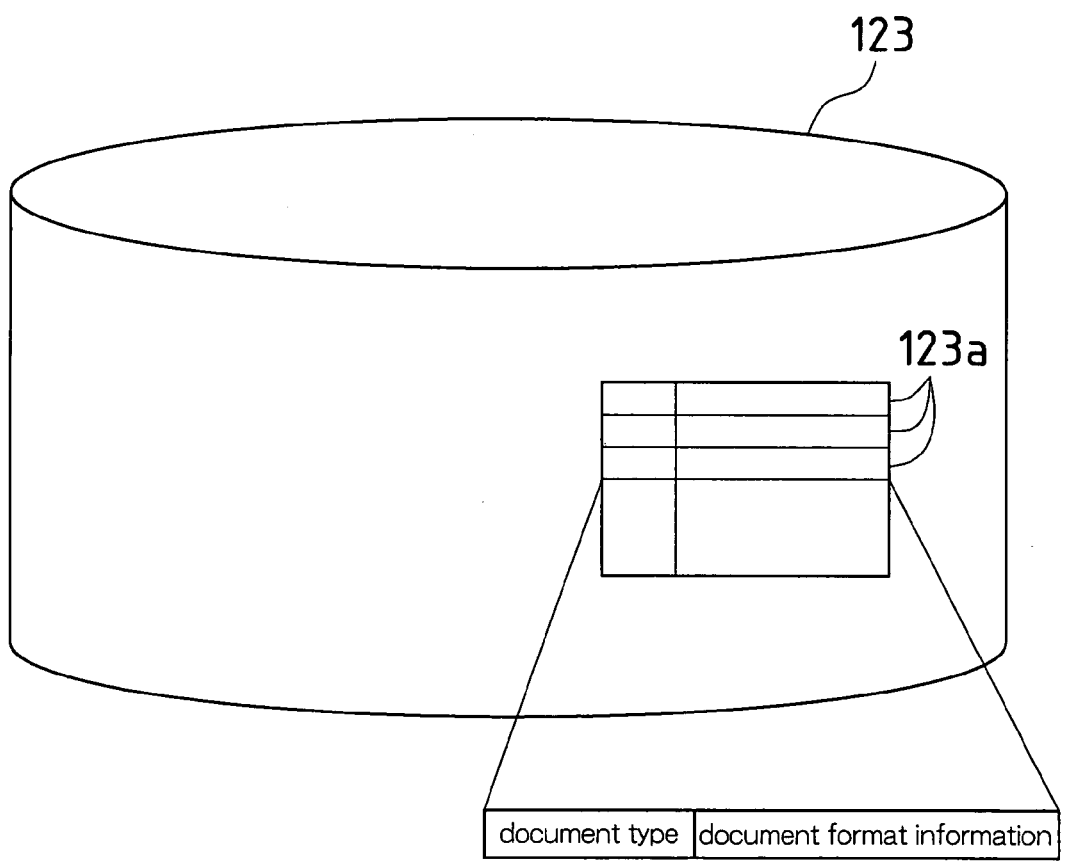
FIG. 4 is a diagram that schematically illustrates a plurality of types of format information within a format information storage unit in the image processing device shown in FIG. 1.

FIG. 4 is a diagram that schematically illustrates a plurality of types of format information within the format information storage unit 123 in the image processing device 2 shown in FIG. 1. As shown in FIG. 4, the format information storage unit 123 stores a plurality of document type information (types such as reports and weekly bulletins) and document format information corresponding to the plurality of document types respectively as a plurality of types of format information 123a, . . . .

In the present embodiment, through the control programs, the control unit 21 is configured to function as means further including a format storage means 218 that stores the plurality of types of format information 123a, . . . regarding the specified document formats in the format information storage unit 123. It should be noted that, as shown in FIG. 4, the plurality of types of the format information 123a, . . . are stored in advance in the format information storage unit 123 by the format storage means 218.

Then, by performing matching between the image data 121a and the plurality of types of format information 123a, . . . stored in the format information storage unit 123 by the format storage means 218, the format determination means 211 determines whether or not the image data 121a is in the specified document format. By doing this, it is possible to determine which document format image data 121a is in based on the types of format information 123a.

Specifically, the format determination means 211 carries out a matching determination as to whether or not the image data 121a matches the document format information of each of the plurality of types of format information 123a, . . . , which are stored by the format storage means 218, and in a case where the image data 121a matches the document format information, a determination is made that it is in the specified document format.

This matching determination can be achieved using various conventional and commonly known matching techniques. For example, although there is no limitation to this, this can be carried out by extracting feature points from a plurality of regions in the image data and determining to what extent the extracted feature points are present in corresponding regions of document format information of the format information. Alternatively, as shown in JP 2004-334913A "Form Recognizing Apparatus and Form Recognizing Method," it is possible to scan an image of a form, detect ruled line corners from a binary image thereof, then detect structural elements of the ruled lines from combining the corners, interconnect these structural elements to obtain frame structure information, and compare it against standard frame structure information of form documents, so that a classification of the scanned form can be recognized. Or as shown in JP H7-210625A "Format Control Method of OCR Device," it is also possible to generate a histogram by accumulating horizontal directions and vertical directions in ruled line images inputted from a scanner, then detect the positions of ruled lines that partition lines and ruled lines that partition columns of text entry frames from distributions in the histogram, then use this ruled line detection to compare against positions of ruled lines in standard forms, thereby recognizing the type of form.

Next, an operational flow of the image processing device 2 shown in FIG. 1 is described with reference to the flowcharts of FIGS. 5 to 7.

Figure 5:
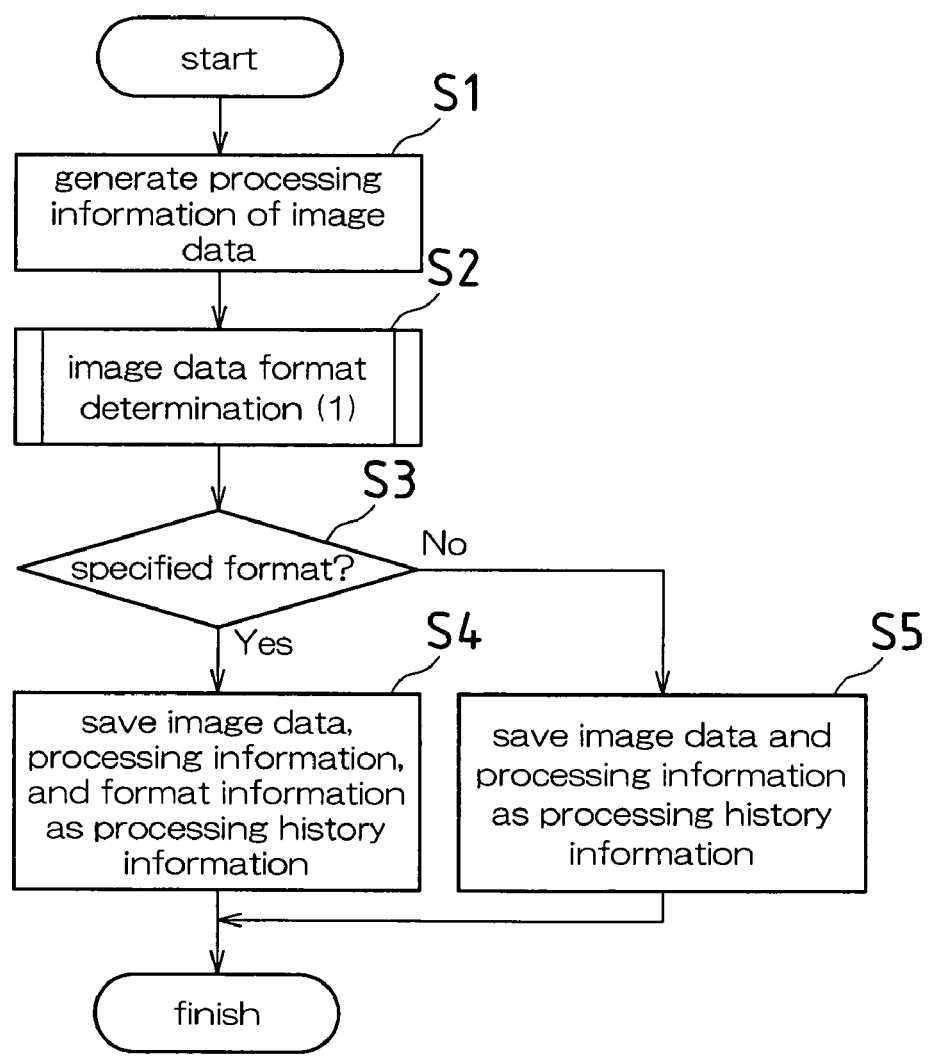
FIG. 5 is a flowchart showing one example of a main routine by which the processing history information is saved in an operational flow of the image processing device shown in FIG. 1.

FIG. 5 is a flowchart showing one example of a main routine by which the processing history information 121x is saved in an operational flow of the image processing device 2 shown in FIG. 1. FIG. 6 is a flowchart showing one example of a subroutine "image data format determination (1)" by which format determination is carried out on the image data in the main routine shown in FIG. 5. Furthermore, FIG. 7 is a flowchart showing one example of a processing routine of outputting and displaying on the display unit 25 the processing history information 121x that has been saved in accordance with the processing routines shown in FIGS. 5 and 6.

In the image processing device 2 according to an embodiment of the present invention, processing information 121b is generated (step S1) of image data 121a that has been processed by the scanner unit 22, the FAX transceiving unit 23 or the like, then format determination is carried out on the image data (step S2: FIG. 6 "Format Determination (1)."

In "Format Determination (1)," the plurality of types of format information 123a, . . . are all read out from the format information storage unit 123 (step S21), then a matching determination is carried out between the image data 121a and the types of format information 123a, . . . that have been read out (step S22), thereby carrying out a judgment as to whether or not the image data 121a is in a specified document format (step S23).

With this judgment, in a case where the image data 121a matches any of the plurality of types of format information 123a, . . . (step S23: yes), the image data 121a is determined to be in a specified format (step S24) and the procedure returns to step S3 of the main routine in FIG. 5. On the other hand, in a case where the image data 121a does not match any of the plurality of types of format information 123a, . . . (step S23: no), the procedure returns as it is to step S3 of the main routine in FIG. 5.

At step S3, in a case where the image data 121a has been determined to be a specified format as a result of the format determination (step S3: yes), the image data 121a, the processing information 121b of the image data 121a, and the format information 121c of the specified document format that was matched with the image data 121a are saved in the processing history information storage unit 121 as the processing history information 121x (step S4). On the other hand, in a case where the image data 121a has been determined not to be a specified format as a result of the format determination (step S3: no), the image data 121a and the processing information 121b of the image data 121a are saved in the processing history information storage unit 121 as the processing history information 121x (step S5) without saving the format information 121c.

In this manner, when the saved processing history information 121x is to be outputted and displayed on the display unit 25, the processing routine shown in FIG. 7 for example is executed.

Namely, in the processing routine shown in FIG. 7, first, a determination is carried out as to whether or not a user is attempting referencing access to the processing history information 121x and the user information is to be inputted (step S6). Then, when there is a referencing access attempt and the user information is to be inputted (step S6: yes), the plurality of sets of the user authority information 122a, . . . are all read out from the user authority information storage unit 122, and the sets of user authority information 122a that have been read out are compared against the inputted user information to perform a determination (step S7).

FIG. 8 shows examples of display screens that are outputted and displayed on the display unit 25 in the processing routine shown in FIG. 7, and FIG. 8(a) shows a display screen in which processing information is displayed as a list. FIG. 8(b) shows a display screen in a case where a processing user of the processing information 121b is not a person of higher authority than the user attempting access to reference. FIG. 8(c) shows a display screen of the format information 121c in a case where a processing user of the processing information 121b is a person of higher authority than the user attempting access to reference.

At step S8, the processing information 121b, . . . is read out from the processing history information 121x of the processing history information storage unit 121, then the processing information 121b, . . . that has been read out is displayed in a list as shown in FIG. 8(a). The processing information that is displayed in a list in this manner is configured such that any of these sets of information can be selected and indicated by the user so as to enable a detailed display (image display). When detailed display is indicated [by the user] for any of the sets of processing information displayed in the list (step S9: yes), the procedure transitions to step S10. On the other hand, in a case where the displayed list is closed (step S9: no), processing finishes as it is.

At step S10, the image data 121a and the format information 121c are read out, and in a case where the processing user of the processing information 121b is not a person of higher authority than the user attempting access to reference (step S10: no), the image data 121a is outputted and displayed as shown in FIG. 8(b) on the display unit 25 (step S11), and in a case where the processing user of the processing information 121b is a person of higher authority than the user attempting access to reference (step S10: yes), a determination is performed as to whether or not there is format information 121c corresponding to the image data 121a for that image data 121a (step S12). In a case where there is format information 121c corresponding to the image data 121a (step S12: yes), then the format information 121c is outputted and displayed on the display unit 25 as shown in FIG. 8(c) (step S13), and in a case where there is no format information 121c corresponding to the image data 121a (step S12: no), the image data 121a is outputted and displayed on the display unit 25 (step S14).

Also, in a case where the image data 121a is constituted by a plurality of pages, processing can be performed in a following manner.

Namely, the format determination means 211 determines whether or not each page in the image data is in a specified document format. And when it is determined that the image data of the page determined by the format determination means 211 is in a specified document format, the saving means 212 saves the format information of the specified document format together with the image data of the page in the storage unit 12 as processing history information.

Figure 9:
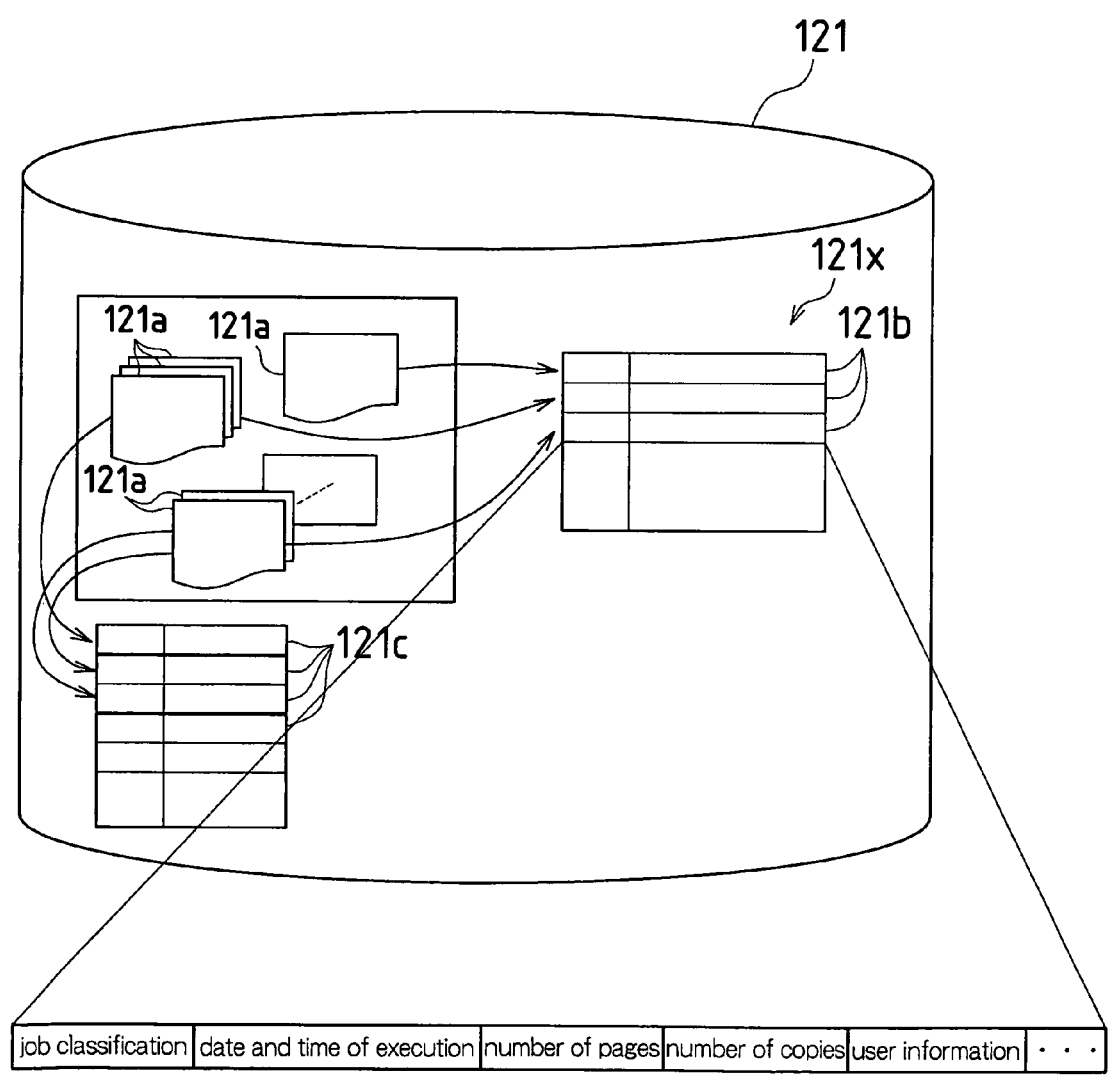
FIG. 9 is a diagram that schematically illustrates the processing history information in a case where the image data is constituted by a plurality of pages.

FIG. 9 is a diagram that schematically illustrates the processing history information 121x in a case where the image data 121a is constituted by a plurality of pages. As shown in FIG. 9, the processing history information storage unit 121 successively accumulates sets of the image data 121a, . . . of each job and sets of processing information 121b, . . . corresponding to those jobs respectively as processing history information 121x, and, when pages of the image data 121a, . . . are in a specified document format, it also accumulates the format information 121c of the specified document format. It should be noted that operations in this case can be carried out by executing for each page the steps S2 to S5 in the flowchart shown in FIG. 5.

In a case where the image data 121a saved in the saving means 212 is constituted by a plurality of pages, the deciding means 215 is configured to decide for each page which sets of image data of the page and format information 121c of the page are to be outputted in accordance with the authority determined by the authority determination means 214.

Specifically, the deciding means 215 outputs the image data 121a of that page when a result determined by the authority determination means 214 is that the accessing user has an authority to reference the image data (here, this is when a processing user of the processing information 121b is not a person of higher authority than the user attempting access to reference). Furthermore, the deciding means 215 is configured to output the format information 121c of that page instead of the image data 121a of that page when the accessing user does not have an authority to reference the image data (here, this is when a processing user of the processing information 121b is a person of higher authority than the user attempting access to reference).

Figure 6:
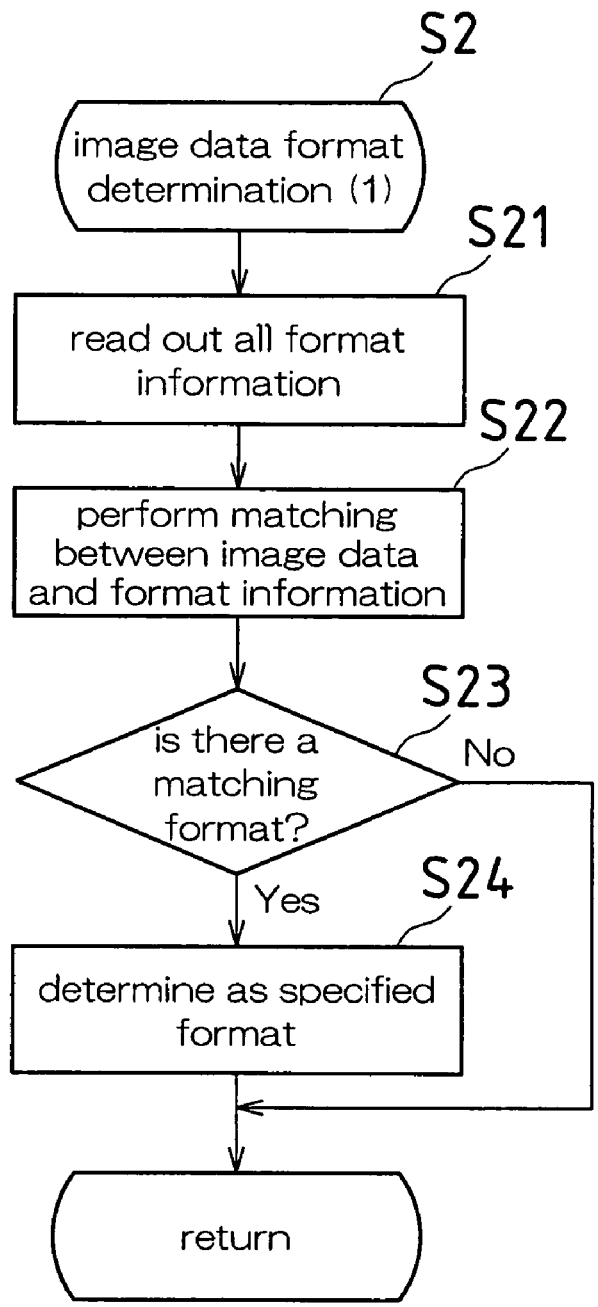
FIG. 6 is a flowchart showing one example of a subroutine "image data format determination (1)" by which format determination is carried out on the image data in the main routine shown in FIG. 5.
Figure 10:
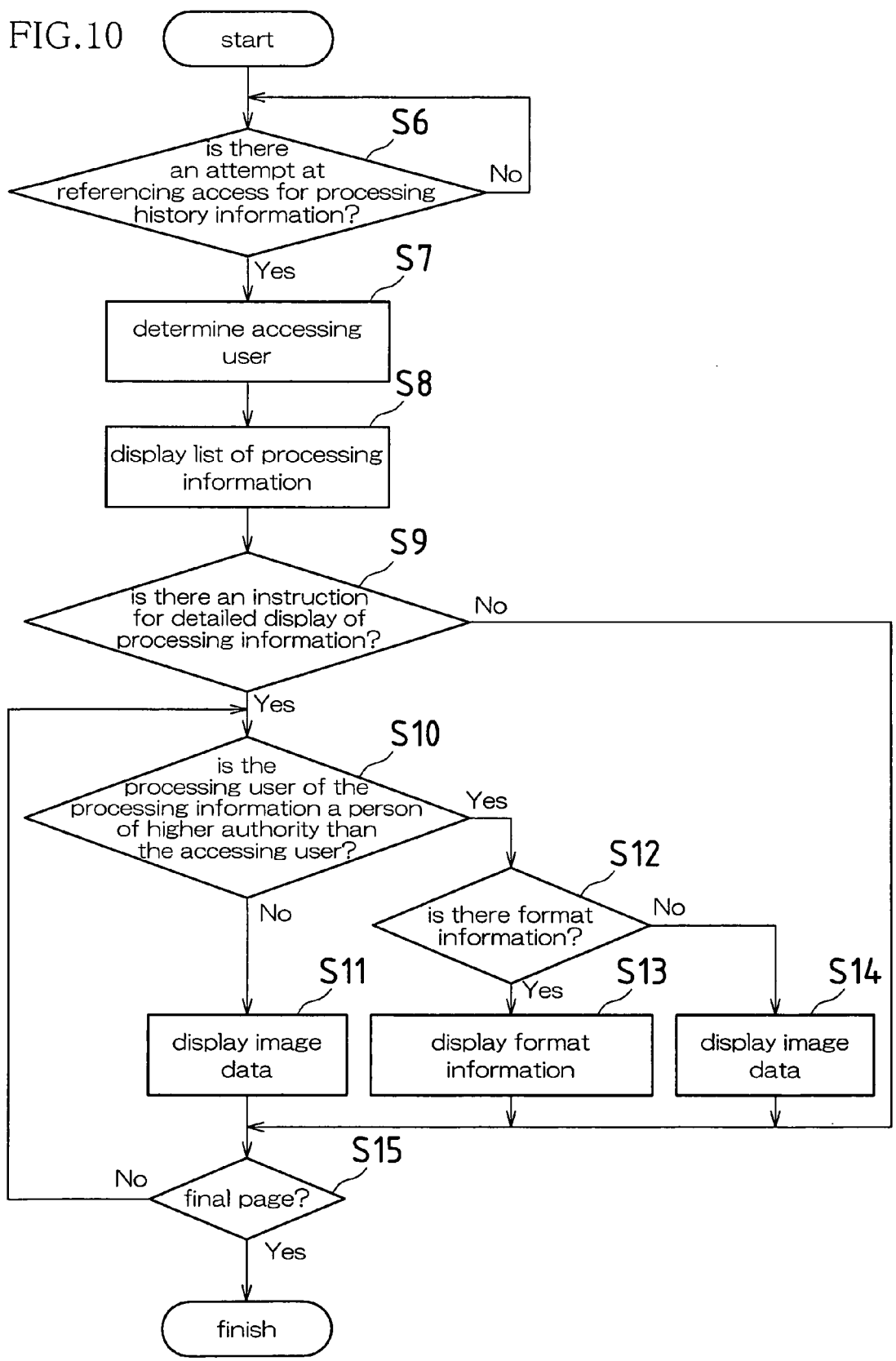
FIG. 10 is a flowchart showing one example of a processing routine of outputting and displaying on the display unit the processing history information in a case where the image data saved in accordance with the processing routines shown in FIGS. 5 and 6 is constituted by a plurality of pages.
Figure 11A:
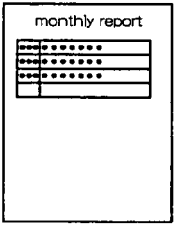
FIG. 11(a) shows an example of a display screen that is outputted and displayed on the display unit in the processing routine shown in FIG. 10, and shows the display screen in which processing information is displayed as a list.
Figure 11B:
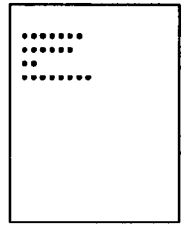
FIG. 11(b) shows an example of a display screen that is outputted and displayed on the display unit in the processing routine shown in FIG. 10, and shows the display screen in a case where a processing user of the processing information is not a person of higher authority than the user attempting access to reference.
Figure 11C:
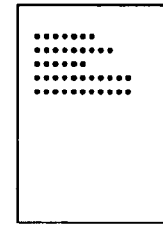
FIG. 11(c) shows an example of a display screen that is outputted and displayed on the display unit in the processing routine shown in FIG. 10, and shows the display screen in a case where a processing user of the processing information is a person of higher authority than the user attempting access to reference.

FIG. 10 is a flowchart showing one example of a processing routine of outputting and displaying on the display unit 25 the processing history information 121x in a case where the image data saved in accordance with the processing routines shown in FIGS. 5 and 6 is constituted by a plurality of pages. Furthermore, FIGS. 11(a) to 11(c) show examples of display screens that are outputted and displayed on the display unit 25 in the processing routine shown in FIG. 10, and FIG. 11(a) shows a display screen in which processing information is displayed as a list. FIG. 11(b) shows a display screen in a case where a processing user of the processing information 121b is not a person of higher authority than the user attempting access to reference. FIG. 11(c) shows a display screen in a case where a processing user of the processing information 121b is a person of higher authority than the user attempting access to reference.

In regard to processing in the processing shown in FIG. 10 that is the same as the processing shown in FIG. 7, same numerical symbols are applied and description thereof is omitted.

At step S10, the image data 121a and the format information 121c are read out, and in a case where the processing user of the processing information 121b is not a person of higher authority than the user attempting access to reference (step S10: no), the image data. 121a of each page is outputted and displayed as shown in FIG. 11(b) on the display unit 25 (step S11), and the procedure transitions to step S15. And in a case where the processing user of the processing information 121b is a person of higher authority than the user attempting access to reference (step S10: yes), a determination is performed for that page as to whether or not there is format information 121c corresponding to that page (step S12). In a case where there is format information 121c corresponding to that page (step S12: yes), then the format information 121c is outputted and displayed on the display unit 25 as shown on the first page in FIG. 11(c) (step S13), and the procedure transitions to step S15. On the other hand, in a case where there is no format information 121c corresponding to that page (step S12: no), then as shown on the second and third pages in FIG. 11(c), the image data 121a of these pages is outputted and displayed on the display unit 25 (step S14), and the procedure transitions to step S15.

At step S15, a determination is performed as to whether it is the final page, and when it is not the final page, the above-described steps S10 to S14 are repeated, and when it is the final page, processing finishes.

It should be noted that when the image data of each job is constituted by a plurality of pages in this manner, in a case where the accessing user does not have authority to reference the image data, it is also possible to set the image data to no-display when at least one page has format information 121c.

That is, the deciding means 215 may be configured to further determine whether or not at least one page contains the format information 121c among the plurality of pages of the image data 121a in each job, and when there is an authority to reference the image data as a result determined by the authority determination means 214, the image data 121a is outputted, and when there is no authority to reference the image data in a case where it has been determined that at least one page contains the format information 121c, the image data 121a of pages not having the format information 121c are not outputted even in a case where it has been determined that there is no format information 121c corresponding to other pages.

Figures 13A, 13B, 13C:
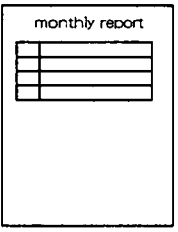
FIG. 13(a) shows an example of a display screen that is outputted and displayed on the display unit in the processing routine shown in FIG. 12, and shows the display screen in which processing information is displayed as a list.
FIG. 13(b) shows an example of a display screen that is outputted and displayed on the display unit in the processing routine shown in FIG. 12, and shows a display screen in a case where the format information is contained in at least one page of the image data of a job in a case where a processing user of the processing information is a person of higher authority than the user attempting access to reference.
FIG. 13(c) shows an example of a display screen that is outputted and displayed on the display unit in the processing routine shown in FIG. 12, and shows the display screen in a case where the format information is not contained in any page of the image data of a job in a case where a processing user of the processing information is a person of higher authority than the user attempting access to reference.

FIG. 12 is a flowchart showing another example of a processing routine of outputting and displaying on the display unit 25 the processing history information 121x in a case where the image data saved by the processing routines shown in FIGS. 5 and 6 is constituted by a plurality of pages. FIGS. 13(a) to 13(c) show examples of display screens that are outputted and displayed on the display unit 25 in the processing routine shown in FIG. 12, and FIG. 13(a) shows a display screen in which processing information is displayed as a list. FIG. 13(b) refers to a case where a processing user of the processing information 121b is a person of higher authority than the user attempting access to reference, and shows a display screen in a case where the format, information 121c is contained in at least one page of the image data of a job. FIG. 13(c) refers to a case where a processing user of the processing information 121b is a person of higher authority than the user attempting access to reference, and shows a display screen in a case where the format information 121c is not contained in any page of the image data of a job.

In regard to processing in the processing shown in FIG. 12 that is the same as the processing shown in FIG. 10, same numerical symbols are applied and description thereof is omitted.

In the processing shown in FIG. 12, after step S9, a determination is performed at step S16 as to whether or not the format information 121c is contained in at least one page among the plurality of pages.

In a case where it is determined as a result of the determination at step S16 that at least one page contains the format information 121c when there is no format information 121c corresponding to the page at step S12 (step S17: yes), then as shown on the second and third pages in FIG. 13(b), the image data 121a of these pages is not outputted and displayed on the display unit 25, and the procedure transitions to step S15. On the other hand, in a case where it is determined as a result of the determination at step S16 that the format information 121c is not contained on any page (step S17: no), then the image data 121a of these pages is outputted and displayed on the display unit 25 as shown in FIG. 13(c) (step S14), and the procedure transitions to step S15.

Figure 14:
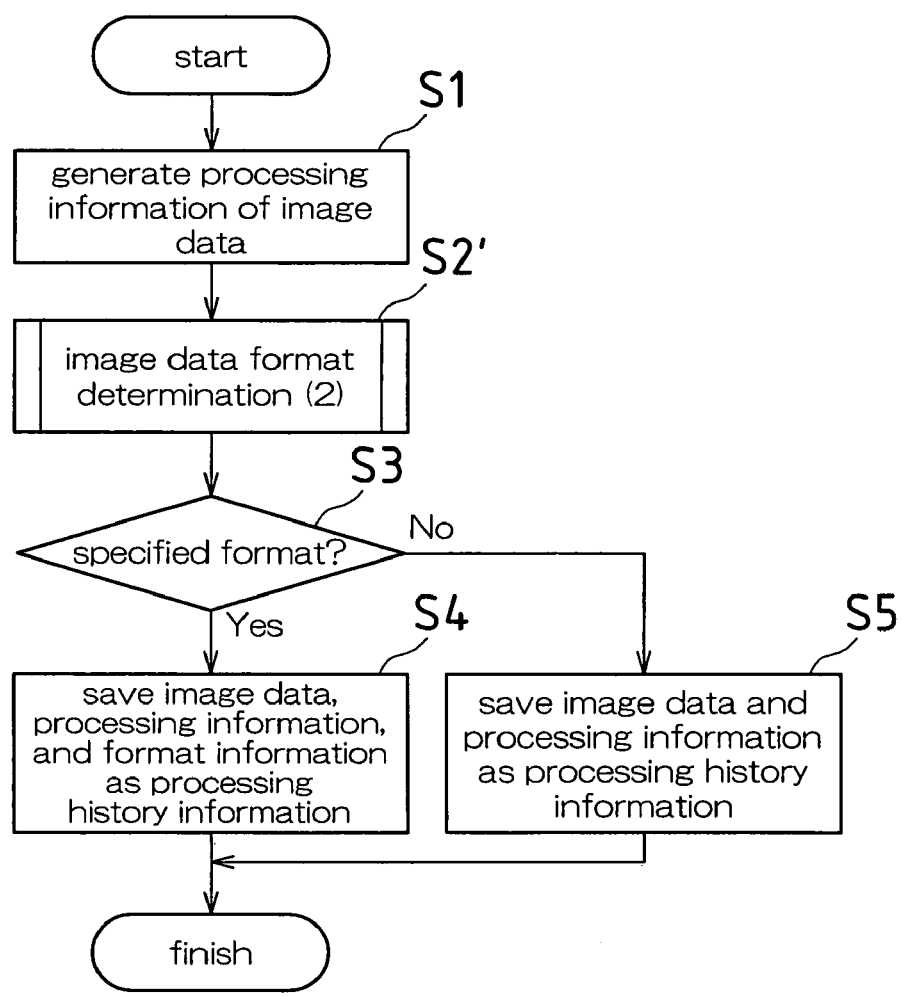
FIG. 14 is a flowchart showing a case where another example of format determination "image data format determination (2)" carried out in the main routine shown in FIG. 5.

In the image processing device 2 according to this embodiment of the present invention, in the subroutine of step S2 "Format Determination (1)," the determination is performed as shown in FIG. 5 by matching the image data and the various types of format information that is stored in advance. However, as shown in FIG. 14, it is also possible to perform the determination in a subroutine of step S2' "Format Determination (2)" by extracting specified information contained in the image data from various types of identifying information that has been stored in advance.

In this case, the storage unit 12 is provided with an identifying information storage unit 124 (see dashed line in FIG. 1) that stores identifying information for identifying the plurality of types of document formats respectively in regard to the specified document formats.

Figure 15:
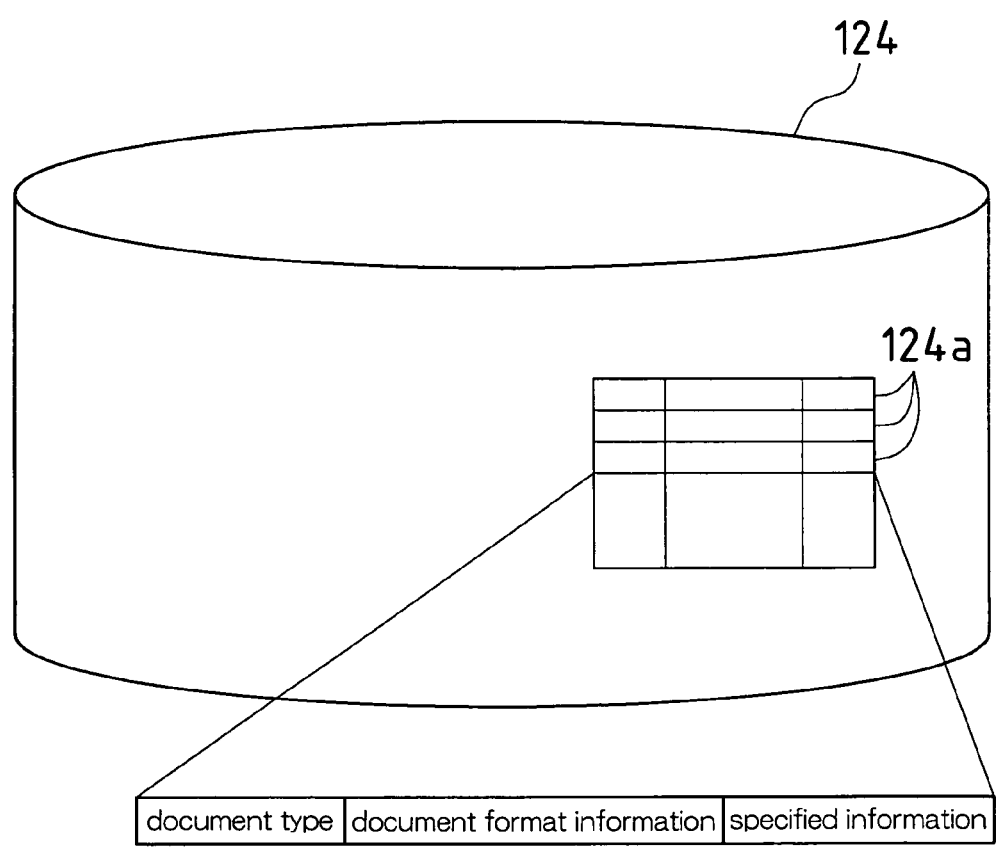
FIG. 15 is a diagram that schematically illustrates identifying information within the identifying information storage unit in the image processing device shown in FIG. 1.

FIG. 15 is a diagram that schematically illustrates identifying information within the identifying information storage unit 124 in the image processing device 2 shown in FIG. 1. As shown in FIG. 15, the identifying information storage unit 124 stores a plurality of document type information (types such as reports and weekly bulletins), document format information corresponding to the plurality of document types respectively, and specified information (for example, an identifying number) corresponding to the plurality of document types respectively as identifying information 124a.

Through the control programs, the control unit 21 is configured to function as means further including an identifying information storage means 219 (see dashed line in FIG. 1) that stores the sets of identifying information 124a, . . . in the identifying information storage unit 124. It should be noted that the sets of identifying information 124a, . . . are stored in advance in the identifying information storage unit 124 by the identifying information storage means 219.

And the format determination means 211 is configured to determine whether or not the image data 121a is in a specified document format by recognizing the specified information (for example, a barcode or a QR code) contained in the image data 121a, and extracting the recognized specified information (for example, an identifying number) from the specified information (for example, an identifying number) in the sets of identifying information 124a, . . ., that has been stored by the identifying information storage means 219. In this manner, if specified information such as a barcode or QR code is appended to the image data 121a, by analyzing that information it is possible to determine whether the image data is in a specified document format, and therefore reliable determinations can be carried out and processing speeds can be improved since there is no need to carry out complicated processing such as the above-described matching process.

Figure 16:
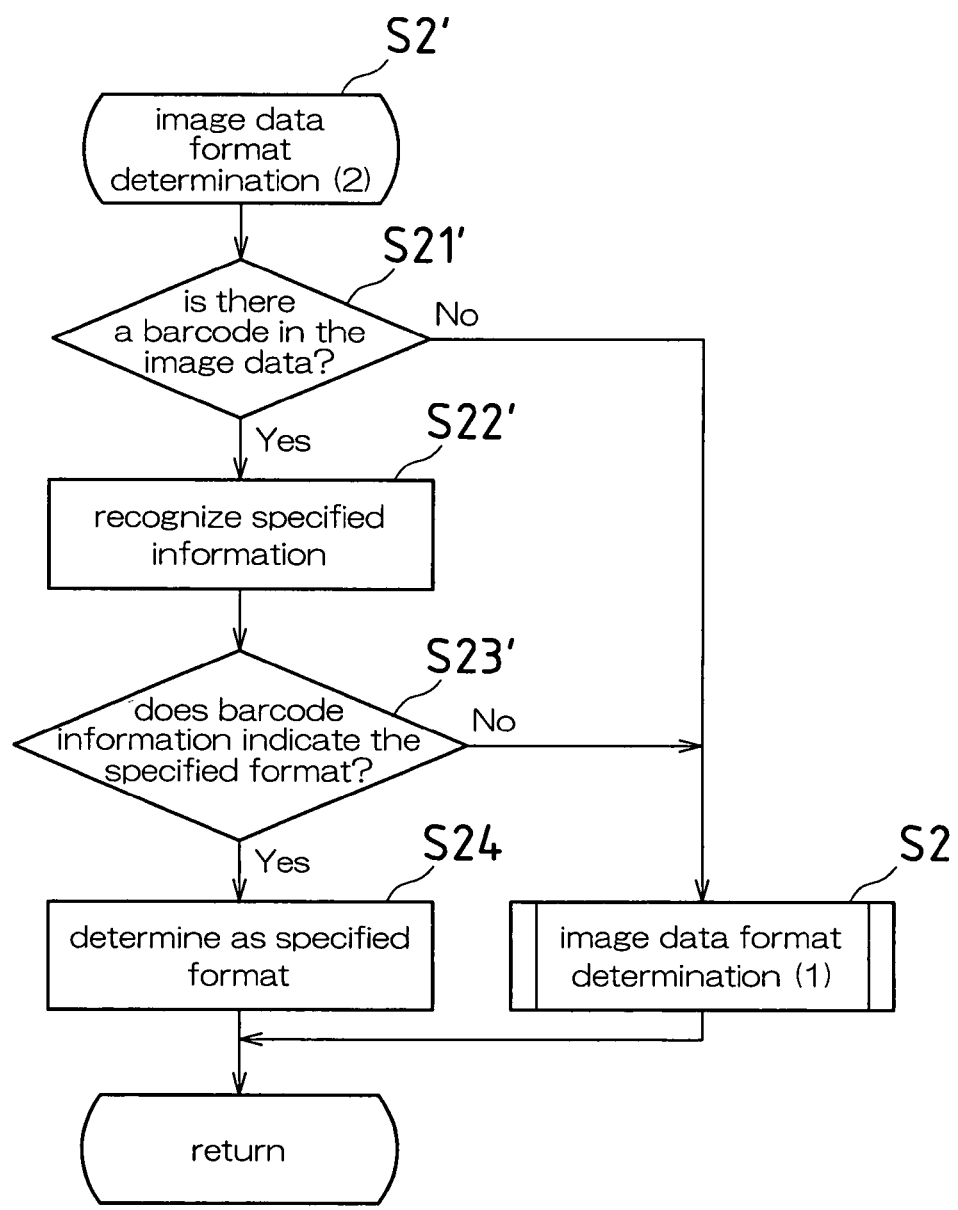
FIG. 16 is a flowchart showing another example of a subroutine "image data format determination (2)" by which format determination is carried out.

FIG. 16 is a flowchart showing another example of a subroutine "Image Data Format Determination (2)" by which format determination is carried out.

In "Format Determination (2)" in FIG. 16, first a determination is performed as to whether or not specified information (here, a barcode) is contained in the image data 121a (step S21'), and in a case where the specified information is contained in the image data 121a (step S21': yes), by reading out all of the sets of identifying information 124a, . . . from the identifying information storage unit 124, then recognizing the specified information contained in the image data 121a (step S22'), and extracting the recognized specified information from the specified information of the sets of identifying information 124a, . . . that have been read out, a judgment is carried out (step S23') as to whether or not the image data 121a is indicated in the specified document format. Specifically, in a case where the recognized specified information has been able to be extracted from the specified information of the sets of identifying information 124a, . . . that have been read out, it is judged that the image data 121a is indicated in the specified document format, and in a case where it was unable to be extracted, it is judged that the image data 121a is not indicated in the specified document format.

With this judgment, in a case where the specified information of the image data 121a indicates the specified document format (step S23': yes), the image data 121a is determined to be in a specified format (step S24) and the procedure returns to step S3 of the main routine in FIG. 14. On the other hand, in a case where the specified information is not contained in the image data 121a (step S21': no), or in a case where the specified information of the image data 121a is not indicated in the specified document format (step S23': no), the processing of the "Format Determination (1)" shown in FIG. 6 is carried out, after which the procedure returns to step S3 of the main routine in FIG. 14.

It should be noted that in a case where the image data 121a is constituted by a plurality of pages, equivalent processing can be carried out for each page.

Incidentally, in the present embodiment, the saving means 212 saves the image data and the format information when the image data is in the specified document format, but when highly confidential image data is saved, even though a configuration is in place in which the image data can be referenced by users of higher authority only for example, a possibility remains that the image data may be referenced by a third party not having authority.

For this reason, the saving means 212 may be configured such that, when the image data 121a determined by the format determination means 211 is judged to be in a specified document format, instead of saving the image data 121a, it saves the format information 121c of the specified document format in the processing history information storage unit 121 as the processing history information 121x. In this manner, by saving only the format information, highly confidential important image data is not saved, and therefore confidentiality can be maintained reliably.

Figure 17:
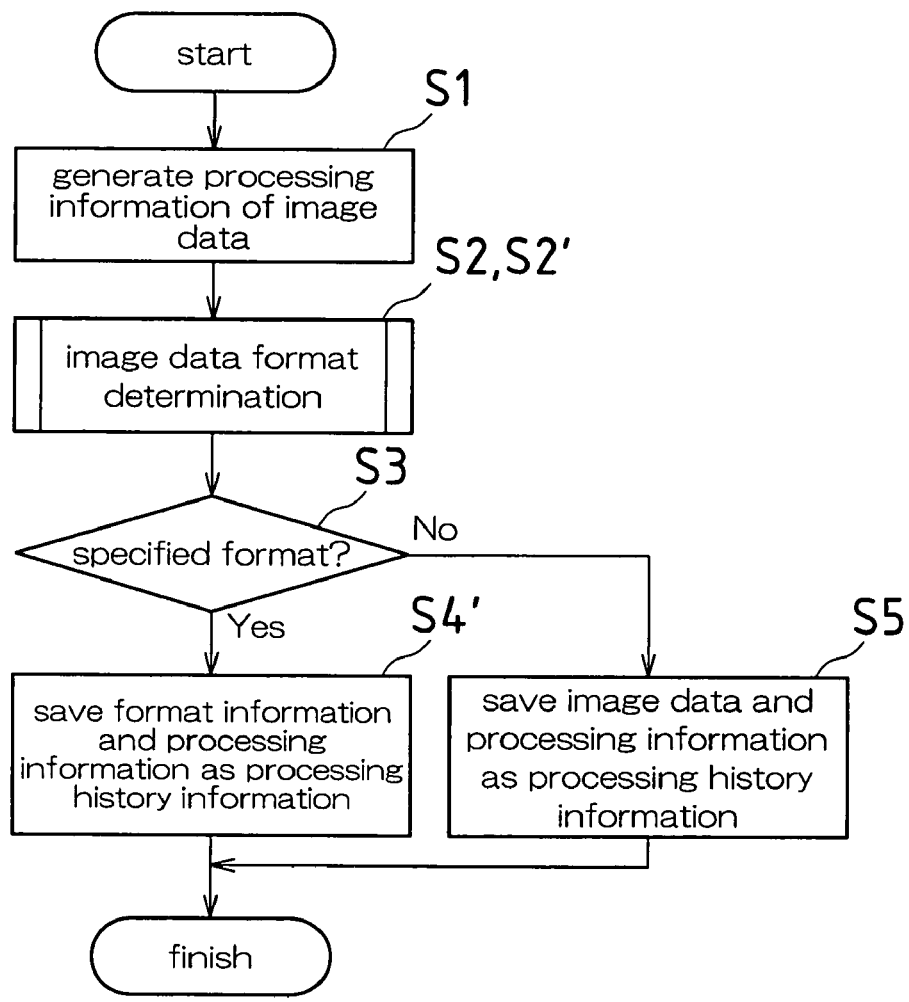
FIG. 17 is a flowchart showing another example of a main routine by which the processing history information is saved in an operational flow of the image processing device shown in FIG. 1.

FIG. 17 is a flowchart showing another example of a main routine by which the processing history information 121x is saved in an operational flow of the image processing device 2 shown in FIG. 1.

In regard to processing in the processing shown in FIG. 17 that is the same as the processing shown in FIGS. 5 and 14, same numerical symbols are applied and description thereof is omitted.

At step S3, in a case where the image data 121a has been determined to be a specified format as a result of the format determination (step S3: yes), the processing information 121b of the image data 121a, and the format information 121c of the specified document format that was matched with the image data 121a are saved in the processing history information storage unit 121 as the processing history information 121x without saving the image data 121a (step S4').

Second Embodiment

Figure 18:
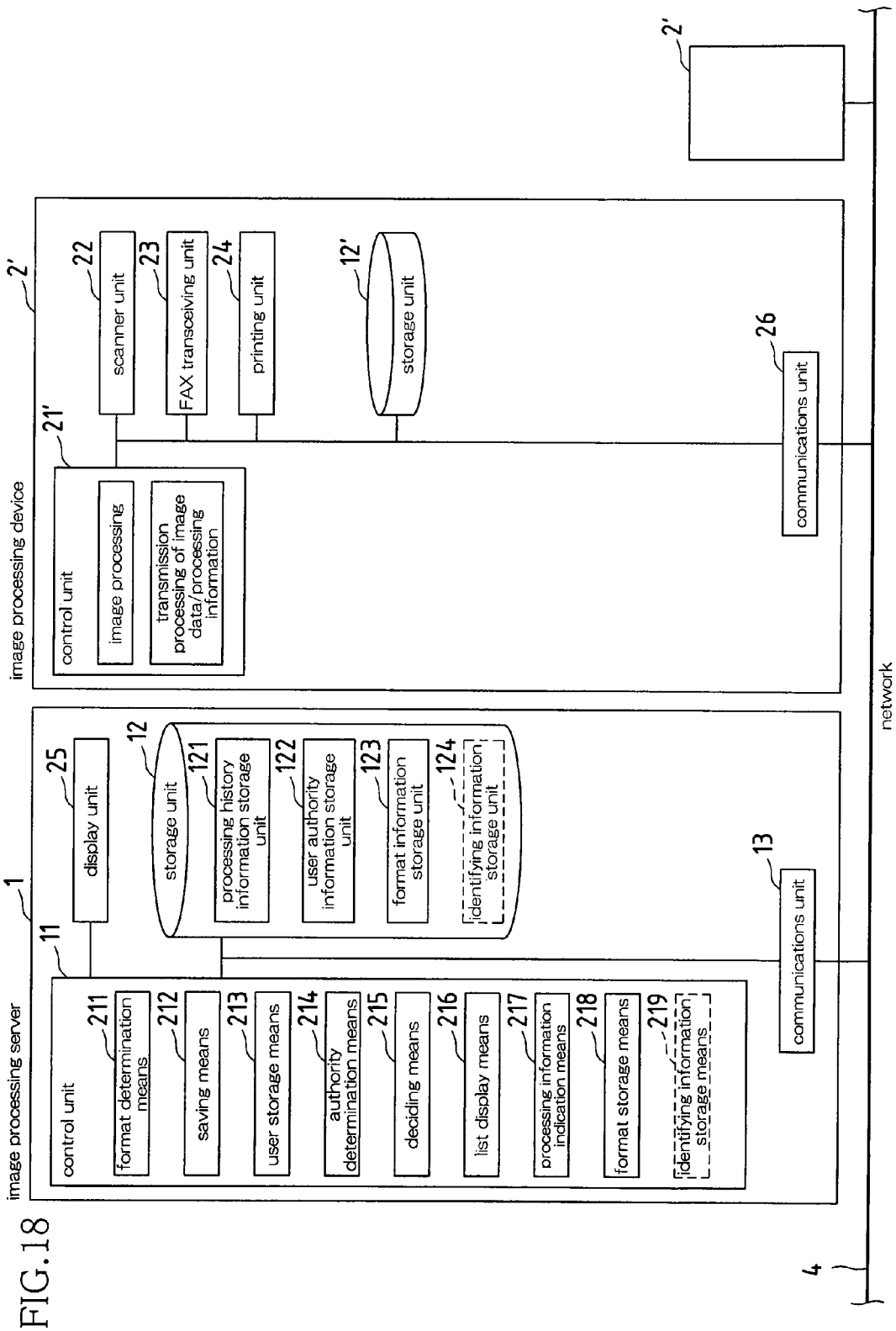
FIG. 18 is a block diagram that schematically illustrates an example system configuration of an image processing server according to an embodiment of the present invention.

FIG. 18 is a block diagram that schematically illustrates an example system configuration of an image processing server according to an embodiment of the present invention.

An image processing server 1 shown in FIG. 18 is connected via a network 4 to a plurality of image processing devices 2', . . . , and is configured to accumulate and save the image data processed by the image processing devices 2'.

Specifically, the image processing server 1 is capable of communicative connections such as data communications with the image processing devices 2', . . . via a network 4 such as a LAN (local area network).

The image processing devices 2', . . . shown in FIG. 18 are here configured as digital multifunction machines and are provided with a control unit 21', a scanner unit 22, a FAX transceiving unit 23, a printing unit 24, a storage unit 12', and a communications unit 26 such as a network interface. The scanner unit 22, the FAX transceiving unit 23, the printing unit 24, the storage unit 12', and the communications unit 26 are connected to the control unit 21'. Each time image data is generated or received/transmitted during such events as printing or facsimile communications, the image processing device 2' may be configured to generate processing information of the image data, and send the image data and the processing information thereof to the image processing server 1, or may be configured to temporarily accumulate the image data and the processing information in its storage unit 12', then send the image data and the processing information thereof to the image processing server 1 in response to access or a request from the image processing server 1.

The communications unit 26 is connected to the network 4 and is configured to be capable of carrying out data communications between the image processing server 1 via the network 4.

The control unit 21' includes a CPU and a memory such as a ROM and a RAM, which are not shown in the diagram, and is configured such that image processing, transmission processing of image data/processing information, or various types of control are carried out by using the CPU to read out various control programs from the memory and execute the control programs that have been read out.

The image processing server 1 is provided with a control unit 11, a storage unit 12, a display unit 25, and a communications unit 13 such as a network interface. The storage unit 12, the display unit 25, and the communications unit 13 are connected to the control unit 11. The image processing server 1 is configured to store the image data and the processing information that are sent from the image processing devices 2' in the storage unit 12 as the processing history information 121x.

And in the image processing server 1, the control unit 11 is configured to carry out control equivalent to that of the control unit of the image processing device 2 shown in FIG. 1. Namely, through the control programs, the control unit 11 is configured to function as means including a format determination means 211 that determines whether or not image data that has been sent from the image processing devices 2', . . . is in a specified document format and, a saving means 212 that, when the image data that has undergone determination by the format determination means 211 is determined to be in a specified document format, saves format information of the specified document format together with the image data in the storage unit 12 as processing history information.

With this image processing server 1, an effect equivalent to that of the image processing device 2 shown in FIG. 1 can be achieved. Namely, in the saving means 212, when the image data 121a determined by the format determination means 211 is judged to be in the specified document format, the format information 121c of the specified document format is saved together with the image data 121a as the processing history information 121x, and therefore only the format information 121c can be referenced by a person not having authority for image data 121a that is highly confidential, thereby enabling notification to be given as to the type of image data 121a while maintaining the confidentiality of the image data 121a, and this enables management to be carried out based on document format as to whether or not the image data 121a involves usage for private purposes.

It should be noted that in the image processing server 1, when the control unit 21 is configured through the control programs to function as means including the user storage means 213, the authority determination means 214, and the deciding means 215, the user information stored by the user storage means 213 can be stored for example for each of a predetermined division (for example, departments). Furthermore, when the control unit 21 is configured through the control programs to function as means further including the format storage means 218 and/or the identifying information storage means 219, the format information stored by the format storage means 218 and/or the identifying information storage means 219 can be stored for example for each of a predetermined division (for example, departments).

The present invention can be embodied and practiced in other different forms without departing from the spirit and essential characteristics thereof. Therefore, the above-described working examples are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. An image processing device in which predetermined image processing is carried out on image data, and the image data that has been processed is saved as processing history information, comprising:
   a) at least one memory storing an instruction set, the image data and processing information thereof and user authority information; and
   b) a processor for running the instruction set, the processor being in communication with the memory, wherein the processor creates:
   a format determination unit that determines whether or not the image data is in a specified document format;
   a saving unit that, when the image data determined by the format determination unit is in the specified document format, saves format information of the specified document format together with the image data and the processing information thereof in the memory as the processing history information and that, when the image data determined by the format determination unit is not in the specified document format, does not save the format information but saves the image data and the processing information thereof in the memory as the processing history information;
   an authority determination unit that determines whether or not a processing user of the processing information of the image data saved by the saving unit is a person of higher authority than a user indicating output of the image data; and
   a deciding unit that, when the processing user is determined not to be the person of higher authority by the authority determination unit, decides to output the image data, and that, when the processing user is determined to be the person of higher authority by the authority determination unit and the format information corresponding to the image data indicated to be outputted is in the memory, then decides to output only the format information, and that, when the processing user is determined to be the person of higher authority by the authority determination unit and the format information corresponding to the image data indicated to be outputted is not in the memory, then decides to output the image data.

2. The image processing device according to claim 1, wherein when the image data saved by the saving unit is constituted by a plurality of pages, the deciding unit decides for each of the pages which of the image data of the page and the format information of the page is to be outputted in accordance with a determination result of whether or not the processing user is the person of higher authority by the authority determination unit.

3. The image processing device according to claim 2, wherein the deciding unit further determines whether or not at least one page among the plurality of pages contains format information and decides that, when it is determined by the authority determination unit that the processing user is the person of higher authority, the processor outputs only the format information for any page having format information, and does not output image data of the page for pages not having format information, when format information is contained in at least one page.

4. The image processing device according to claim 1, further comprising a format storage unit that stores one or a plurality of types of format information in regard to the specified document formats, wherein the format determination unit determines whether or not the image data is in the specified document format by performing matching between the image data and the one or plurality of types of format information stored by the format storage unit.

5. The image processing device according to claim 1, wherein the specified document format is any one of a report, a weekly bulletin and an application.

6. The image processing device according to any one of claims 1, 2, 3, and 4, wherein the format determination unit determines whether or not the image data is in the specified document format by extracting specified information contained in the image data.

7. An image processing server, which is connected via a network to one or a plurality of image processing devices in which predetermined image processing is carried out on image data, and which saves image data sent from the image processing device as processing history information, comprising:
 a) at least one memory storing an instruction set, the image data and processing information thereof and user authority information; and
 b) a processor for running the instruction set, the processor being in communication with the memory, wherein the processor creates:
 a format determination unit that determines whether or not the image data sent from the image processing device is in a specified document format;
 a saving unit that, when the image data determined by the format determination unit is in the specified document format, saves format information of the specified document format together with the image data and the processing information thereof in the memory as the processing history information and that, when the image data determined by the format determination unit is not in the specified document format, does not save the format information but saves the image data and the processing information thereof in the memory as the processing history information;
 an authority determination unit that determines whether or not a processing user of the processing information of the image data saved by the saving unit is a person of higher authority than a user indicating output of the image data based on the user authority information; and
 a deciding unit that, when the processing user is determined not to be the person of higher authority by the authority determination unit, decides to output the image data, and that, when the processing user is determined to be the person of higher authority by the authority determination unit and the format information corresponding to the image data indicated to be outputted is in the memory, then decides to output only the format information, and that, when the processing user is determined to be the person of higher authority by the authority determination unit and the format information corresponding to the image data indicated to be outputted is not in the memory, then decides to output the image data.

8. The image processing server according to claim 7, wherein the specified document format is any one of a report, a weekly bulletin and an application.

* * * * *